United States Patent [19]

Waters

[11] 4,088,890
[45] May 9, 1978

[54] OPTICAL POSITION DETECTOR

[75] Inventor: James P. Waters, Ellington, Conn.

[73] Assignee: United Technologies Corporation, Hartford, Conn.

[21] Appl. No.: 727,432

[22] Filed: Sep. 28, 1976

[51] Int. Cl.² .............................................. G05B 1/00
[52] U.S. Cl. ............................... 250/202; 219/121 L; 331/DIG. 1; 219/124.4
[58] Field of Search ............................ 250/202, 561; 331/DIG. 1; 356/138, 153, 172; 219/121 L, 121 LM, 124, 125 R, 125 PL

[56] References Cited

U.S. PATENT DOCUMENTS

| 3,135,857 | 6/1964 | Von Voros | 250/202 X |
| 3,695,771 | 10/1972 | Bardos | 250/562 X |
| 3,766,125 | 9/1973 | Okada et al. | 250/202 |
| 3,766,355 | 10/1973 | Kottkamp | 250/202 X |

FOREIGN PATENT DOCUMENTS

| 1,153,282 | 5/1969 | United Kingdom | 219/121 L |

*Primary Examiner*—James B. Mullins
*Attorney, Agent, or Firm*—Prutzman, Hayes, Kalb & Chilton

[57] ABSTRACT

An optical position detector is provided for optically locating a seam between two abutting parts having reflective surfaces and features means for producing a continuous laser beam having a predetermined focus spot for scanning the workpiece and a photodetector. The photodetector is positioned to receive radiation reflected from the workpiece upon relative movement of the workpiece.

13 Claims, 4 Drawing Figures

OPTICAL POSITION DETECTOR

This invention generally relates to an optical seam locator and particularly concerns apparatus for directing a laser beam onto a workpiece and a detector for providing an output signal responsive to radiation reflected from the workpiece for indicating the position of a seam on the workpiece when an output signal from the detector is below a predetermined threshold.

A primary object of this invention is the provision of a new and improved work processing apparatus which provides for locating a seam between abutting surfaces of a workpiece by a noncontact optical technique which operates at stand-off distances from the workpiece and utilizes a laser light source.

Another object of this invention is to provide an apparatus of the above described type which is adapted for high production work processing operations for automatically locating a seam of a workpiece before or during its processing and which is particularly suited to provide variable sensitivity for different applications.

Yet another object of this invention is to provide such an apparatus which is suited for a variety of automated machining operations such as welding, melting, drilling, cutting and similar material processing which may be effectively performed in open atmosphere.

A further object of this invention is to provide a new and improved position detector which not only is capable of locating position or level of a seam between abutting surfaces on a workpiece but is particularly suited to additionally determine the precise points at which the seam begins and ends.

Other objects will be in part obvious and in part pointed out more in detail hereinafter.

A better understanding of this invention will be obtained from the following detailed description and the accompanying drawings of an illustrative application of this invention.

IN THE DRAWINGS

Figure 1:
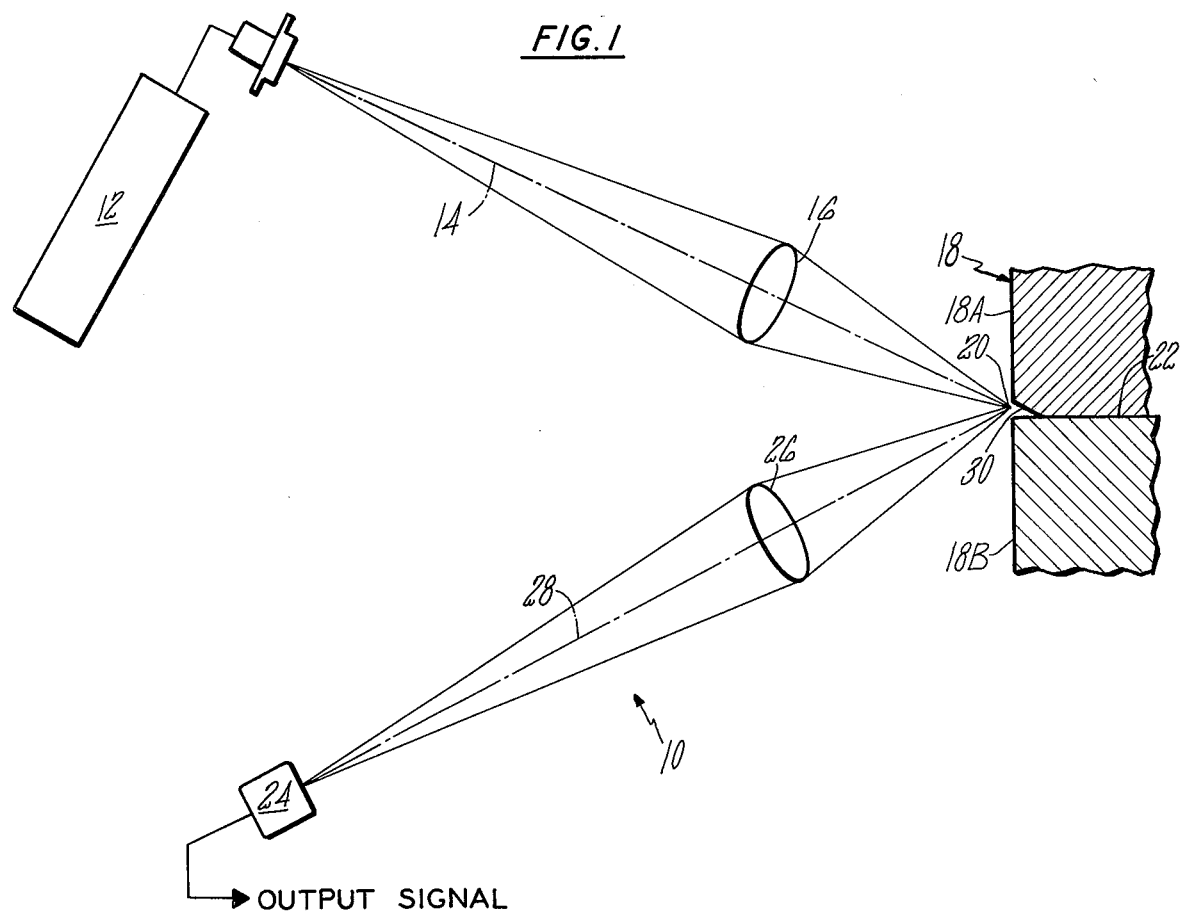
FIG. 1 is a schematic view of an optical position detector included in the apparatus of this invention.

Referring to the drawings in detail, an optical position detector or sensor 10 is shown including a commercially available injection laser light source such as a conventional Gallium Arsenide laser 12 which is schematically illustrated in FIG. 1 and will be understood to be capable of producing coherent radiation directed along a beam input axis 14. An input focus member or lens 16 is positioned on the beam input axis 14 at a distance from a workpiece 18 for intercepting and focusing that beam at a focus spot 20 on the workpiece 18. The workpiece 18 shown in FIG. 1 will be understood to have abutting parts 18A, 18B with surfaces of reflective material bounding a seam 22 contained in a plane extending between the workpiece parts 18A, 18B.

To produce a continuous output signal indicative of seam location between the parts 18A, 18B of the workpiece 18, the sensor 10 is provided with a conventional photodetector 24 which effects an output signal variable in relation to the intensity of the reflected radiation for indicating the position of the workpiece seam 22 when the output signal from photodetector 24 is below a predetermined threshold. A portion of radiation reflected from the workpiece parts 18A, 18B is collected by an output focus member or imaging lens 26 shown spaced from the workpiece 18 and located on an output axis 28. The photodetector 24 is spaced from the output lens 26 at a distance for focusing the reflected radiation onto photodetector 24. When a seam 22 passes the focus spot 20, the amount of reflected radiation collected by output lens 26 is substantially reduced. Rather than being sharply reflected onto photodetector 24 and providing an output signal having an established minimum signal level indicative of the reflective surfaces of the parts 18A, 18B bounding the seam 22, upon beam and seam alignment the radiation is absorbed or trapped by the crack forming the seam 22. Such absorption of the radiation accordingly results in a decrease in signal below the predetermined threshold to indicate presence of a seam. To provide greater sensitivity in providing clear response upon beam and seam alignment, as opposed to surface irregularities, the seam 22 may be modified as seen in FIG. 1 to include a chamfer 30, e.g., a 0.020 inch wide and 0.040 inch deep chamfer on one side of seam 22.

Figure 2:
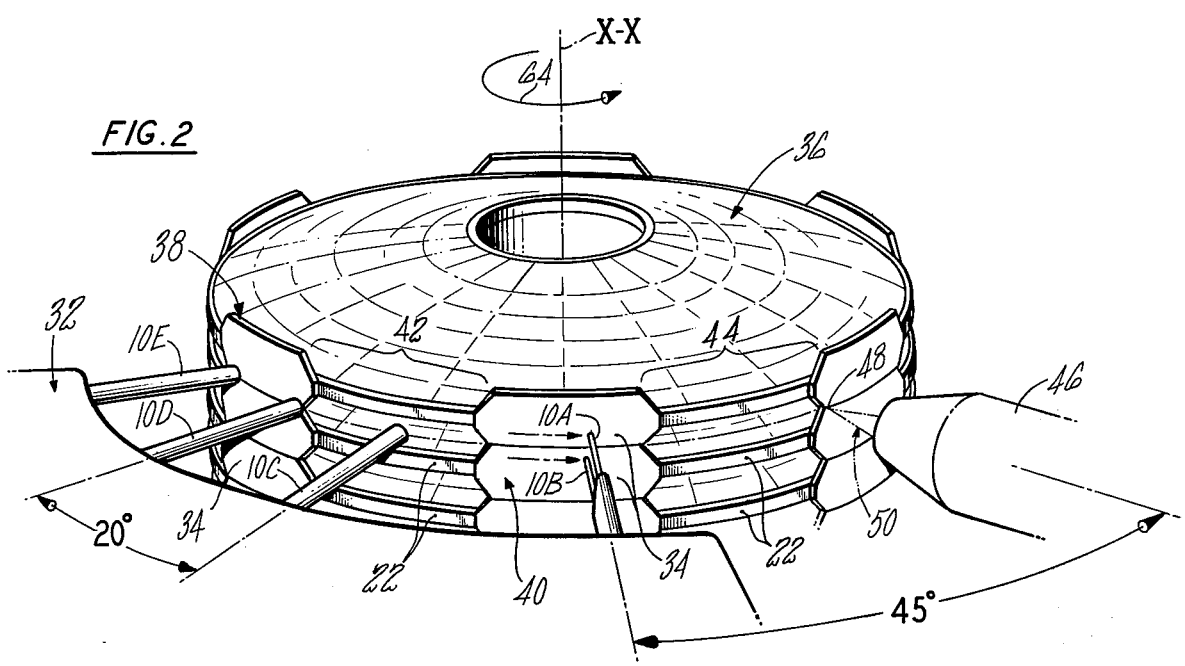
FIG. 2 is an isometric view showing a plurality of detectors of FIG. 1 for controlling an automated work processing operation on a workpiece.

More specifically, a plurality of individual sensors 10 of the type shown in FIG. 1 are illustrated in FIG. 2 as being mounted in compact assembled relation within a housing 32 in an array which not only provides for determining the position or level of a seam between abutting parts of a workpiece, relative to a reference plane such as the top of the workpiece, but also provides for determining the beginning and end of a seam by means of a noncontact technique operable in open atmosphere at a stand-off distance from the workpiece which ensures precision accuracy in determining seam location.

In the sensor array shown in FIG. 2 an application of this invention is shown by way of example for automated laser welding of lugs 34 of a generally cylindrical assembly forming a stacked battery 36 although it is to be understood that this invention is equally adapted for other automated material processing such as melting, drilling, cutting and the like.

In FIG. 2 the battery 36 is shown with arcuate lugs 34 vertically aligned in stacks such as at 38 and 40 angularly spaced at about 30° increments in six stacks around the periphery of the battery 36 with non-reflective spaces or gaps such as at 42 and 44 of about 30° intervals extending between and separating the lug stacks. At any given seam height or level, a series of six seams are contained in a common plane perpendicular to the axis X—X of battery 36. Each of the six seams will be understood to be welded by a single-pass butt weld in sequence at their respective level with the welding progressing from the highest to the lowest levels.

A focus head assembly or laser weld head 46 for a commercially available carbon dioxide laser 47 (FIG. 3) is located in a work processing area constituting a weld zone downstream of two lug sensors 10A, 10B and three level sensors 10C, 10D, 10E, the latter each having focus spots positioned in a common plane with a focus spot 48 of a high power laser beam 50 at the weld head 46. Laser weld head 46 is preferably of a type described in my copending U.S. Pat. application Ser. No. 727,434, filed Sept. 28, 1976, entitled, "Improved Focus Head System" and assigned to the assignee of this invention, the subject matter of which is incorporated herein by reference. It will be understood that the high power laser beam 50 is "on" for an entire weld cycle for each battery, and opening and closing of a high speed beam shutter 52 (FIG. 3) at the weld head 46 is controlled by a timing circuit, generally designated 53 (FIG. 4) responsive to information received from the two lug sensors 10A, 10B to intermittently operate the weld head 46 in precisely timed relation to passage of each seam through the weld zone.

The two lug sensors 10A, 10B are shown in FIG. 2 in vertically spaced alignment with one another and disposed 45° upstream of the laser weld head 46. This arrangement minimizes any possibility of the sensors being contaminated by weld discharge in the weld zone and at the same time reduces the amount of lost time of vertical indexing between levels.

The three level sensors 10C, 10D, 10E are illustrated as being equally spaced about 20° apart from one another with center level sensor 10D about 90° upstream of the weld head 46. The three level sensors 10C, 10D, 10E within housing 32 and weld head 46 shown in FIG. 2 will be understood to be mounted in fixed relation to one another on a carriage 54 shown in FIGS. 3 and 4.

Figure 3:
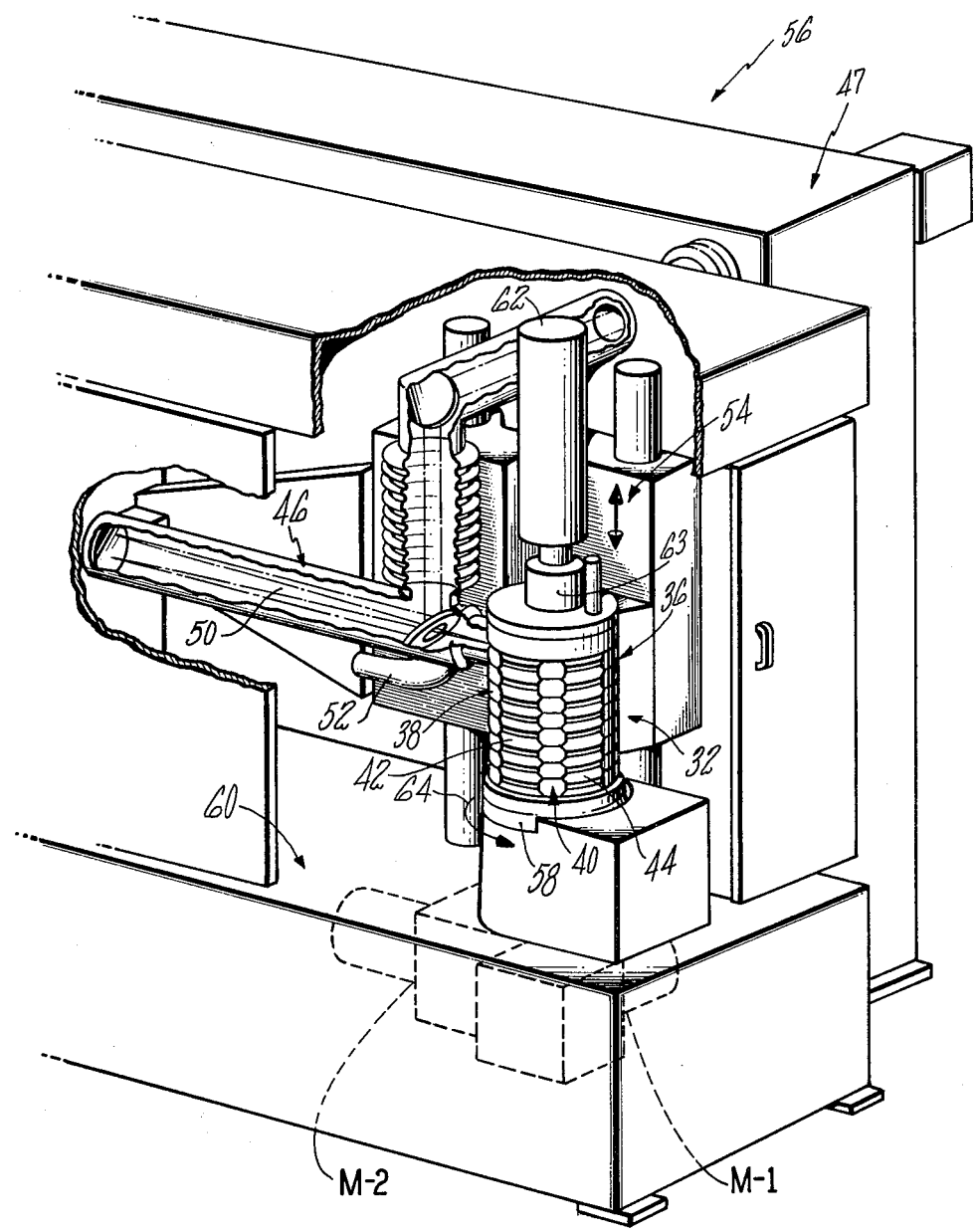
FIG. 3 is an isometric view, partly broken away and partly in section, illustrating an application of the detectors of FIG. 2 incorporated in a machine tool for welding a battery.
Figure 4:
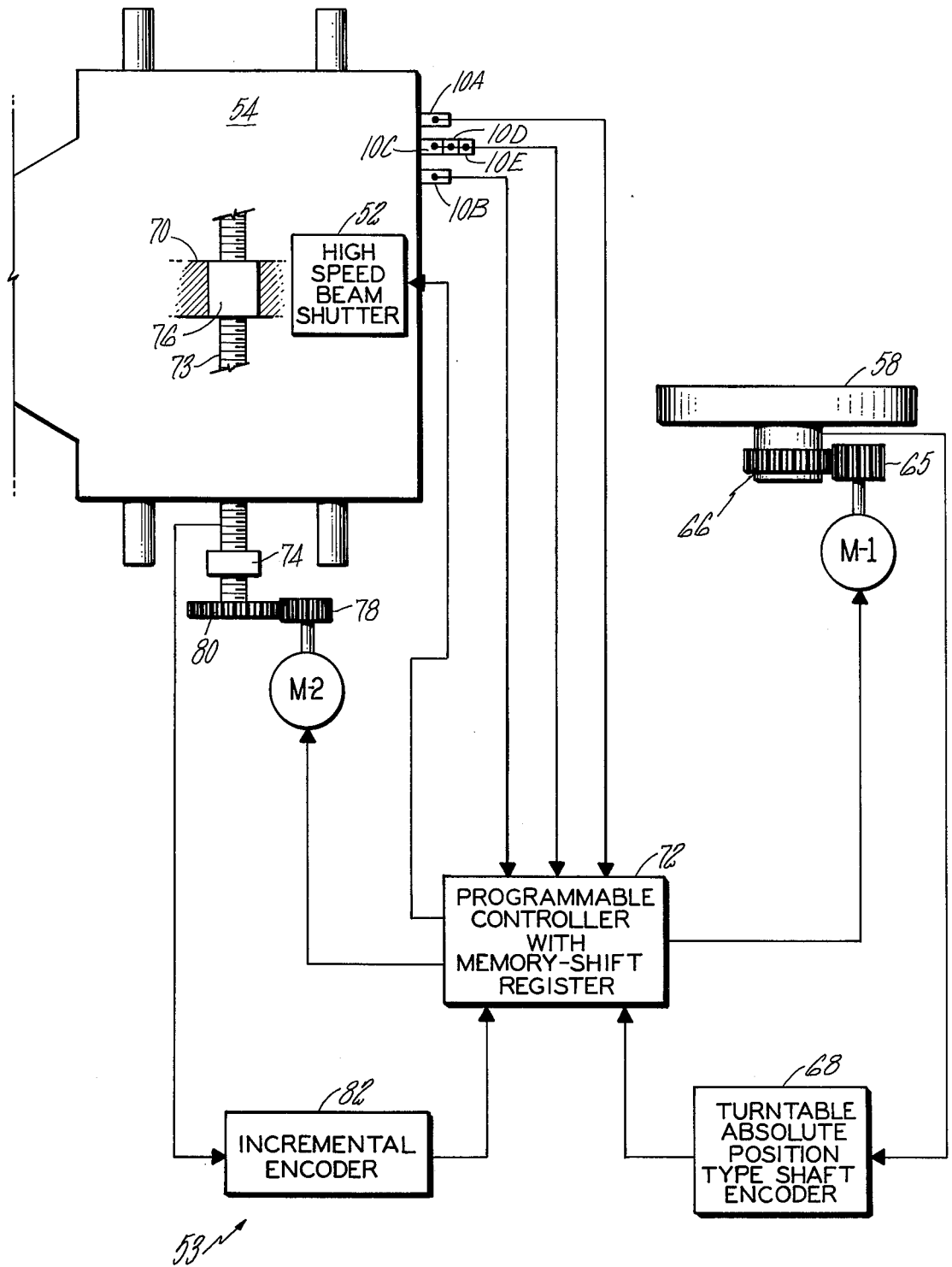
FIG. 4 is a view schematically showing certain logic control components of a timing circuit of the machine tool of FIG. 3.

As best seen in FIGS. 3 and 4, a machine tool 56 is illustrated having a rotary turntable 58 mounted on a frame 60. The stacked battery 36 is symmetrically located on turntable 58 and coaxially secured in position by an axial clamp 62 which will be understood to be air operated and coaxially aligned with the rotational axis X—X of the battery 36 and its turntable 58. Clamp 62 has a rotating clamp pad 63 which presses downwardly on top of the stacked battery 36 which is supported for rotation about axis X—X in a counterclockwise direction shown by arrow 64 as viewed in FIGS. 2 and 3 relative to the housing 32 and its sensors 10.

Turntable rotation may be provided by any suitable drive means such as a variable speed DC motor drive M-1 operated by a suitable power source, not shown, controlled by cycle logic circuitry of a programmable controller 72. The motor drive M-1 has an output gear 65 in meshing engagement with turntable shaft 66 to provide a selectively established speed control. A conventional absolute position type shaft encoder 68 (FIG. 4) is coupled to turntable shaft 66 to continuously provide readout of table position with regard to a starting position of the battery 36. This encoder 68 will be understood to be used in accordance with well-known techniques for both the lug sensing and beam on-off control logic as well as a program input to initiate level shifts. For an understanding of this invention, it is not believed necessary to specifically describe details of various controls, logic circuitry and electrical connections which have been found to perform satisfactorily, for a variety of different circuits and controls may be employed in accordance with conventional techniques to effect the following described machine operation on manual, semi-automatic or automatic program sequencing.

To shift the sensors 10 and weld head 46 from one level to another of the stacked battery 36 in the preferred embodiment of this invention, the carriage 54 is slidably supported on frame 60 of the machine 56 for linear reciprocating movement parallel to rotational axis X—X. Mounted on this carriage 54 is the laser weld head 46, the level and lug sensors 10 within housing 32, and the selectively operable high speed shutter 52 for controlling the welding operation by the high power laser beam 50 at the weld head 46. To drive the carriage 54, a lead screw drive 70 is shown in FIG. 4 which is powered by a variable speed reversible motor M-2, also controlled by cycle logic of the programmable controller 72, for moving the carriage 54 and its components from an upper starting position successively through a series of operating positions precisely established by the focus spots of level sensors 10C, 10D, 10E upon being aligned with a plane containing seams 22 at a given level. The lead screw drive 70 may be of any suitable conventional arrangement wherein lead screw 73 is supported for rotation within bearing housing such as at 74 on frame 60, and a nut 76 fixed to carriage 54 is in threaded engagement with lead screw 73. Rotation of output gear 78 of motor M-2 in a selected angular direction will effect rotation of meshing gear 80 on lead screw 73 to drive carriage 54 in a selected vertical direction. Vertical indexing of the carriage 54 is independent of the rotary motion of turntable 58; the vertical movements for level indexing of the laser weld head sensor system preferably occur without interruption of the turntable 58 and are initiated by cycle logic of the programmable controller 72 during rotation of a gap following the last seam to be welded past the weld head 46.

During automatic operation, the vertical motion to precisely align focus spot 48 of the high power laser beam 50 with the joint or seam is incremental and a resettable incremental encoder 82 is shown coupled to the lead screw 73 to initially effect vertical indexing through the controller 72 to a point just above the seam. At this point the level sensors 10C, 10D, 10E are activated, and vertical movement is slowed to search speed for precise final alignment under level sensor control.

The actual position of each seam 22 relative, say, to the top of battery 36 at any selected level can be sensed in accordance with this invention at any location around the battery periphery. Once a seam 22 has been sensed, the height of the level sensors 10C, 10D, 10E and weld head 46 relative to the stacked battery 36 is locked in and maintained for a weld cycle with the carriage 54 disposed in operating position. The above described relative angular spacing of the lug stacks such as 38, 40 and level sensors 10C, 10D, 10E ensures that at least one of the three level sensors in the described arrangement of FIGS. 2 and 3 is always opposite a lug. Under these conditions, when a sensor focus spot 20 passes over the chamfer 30 of a seam 22 between lugs 34, 34 upon relative vertical movement of the level sensors 10C, 10D, 10E and battery 36, the amount of radiation reflected into photodetector 24 is greatly reduced. Since the gaps such as 42, 44 separating the lug stacks 38, 40 are nonreflective, the other two level sensors either see a non-reflective gap, such as 42 between lug stacks 38 and 40, or the seam chamfer 30, and the output signal from each photodetector 24 of each level sensor 10C, 10D, 10E will read "dark" to indicate the vertical position of the seams 22 at a given level to establish the operating position of carriage 54 and its components at that level. Upon establishing such beam-seam alignment, carriage vertical motion terminates, motion count for incremental encoder 82 is reset for the next succeeding level and the level sensor output may be temporarily locked out until the next vertical indexing cycle.

To determine the beginning and end of each seam 22 regardless of variations in coextending lengths of their abutting metal parts, to in turn provide information to be recorded in the logic circuitry of the programmable controller 72 for determining laser beam-on and beam-off points for subsequently effecting seam welding, the two lug sensors 10A, 10B are shown in FIG. 2 as being located in operative position above and below a seam 22 when the level sensors 10C, 10D, 10E are locked into operating position in stationary aligned relation with the plane containing the seams 22. These two lug sensors 10A, 10B also are of the type shown in FIG. 1. The leading edge of each seam 22 is established at a point where both lug sensors 10A, 10B provide an output signal indicating high reflected radiation. The trailing edge of each seam 22 is established at a point where one of the two lug sensors 10A, 10B provide a signal which drops off to indicate loss of reflection. Accordingly, mismatch between lugs 34, 34 is readily recognized from the output signals of the lug sensor photodetectors 24. The leading edge and trailing edge positions as sensed by the lug sensors 10A, 10B may be arithmetically modified as desired to compensate for a predetermined displacement from mating edges of a seam 22, e.g., for 1/16 inch displaced beam on-off points as well as for the 45° lug sensor displacement relative to the laser weld head 46. Compensated location of beam on-off points may be stored in a memory shift register of the controller 72 for controlling high speed beam shutter 52.

During turntable rotation, the lug sensors 10A, 10B pick up and record the leading seam edge of abutting lugs 34, 34 and also record the location of the trailing seam edge of those lugs. Welding subsequently starts when the leading seam edge of those abutting lugs passes by the laser weld head 46, it being understood that the compensated location of the leading and trailing edge positions is used to control operation of the laser weld head 46 responsive to the beam-on and beam-off control functions of the high beam shutter 52 as determined on a time delayed basis by the programmable controller 72 of the timing circuit 53.

Upon each of the seams 22 at a given level being progressively welded, vertical indexing of carriage 54 is provided in response to a signal from the controller 72 to the motor M-2 governing rotation of lead screw drive 70 to the carriage 54. As noted above, level shift of the described weld head sensor system occurs during passage of a gap such as 44 following the last weldment past the weld head 46, and precise beam-seam alignment is effected under the control of the level sensors 10C, 10D, 10E before the next lug stack 40, e.g., is past the weld head. Preferably not more than one lug stack need be rotated past the weld head 46 without being welded during a level shift before the level sensors 10C, 10D, 10E lock onto a seam 22 and lug sensors 10A, 10B pick up and record the leading edge of the next seam to be welded. Once the seams 22 in the last level of the stacked battery 36 are each welded, a preset determination of the vertical transfer in the controller 72 provides a readout and initiates an "end of weld" function upon completion, closes the main laser shutter, not shown, effects reset of the encoder 68 to "zero" rotational location to provide an angular starting position for the next weld cycle and returns the carriage 54 and its components upwardly into starting position in readiness for welding the next battery.

As will be apparent to persons skilled in the art, various modifications, adaptations and variations of the foregoing specific disclosure can be made without departing from the teachings of this invention.

I claim:

1. An apparatus for locating a seam between abutting reflective surfaces of a workpiece, the apparatus comprising an optical position detector including a photodetector and means for producing a continuous laser beam of substantially uniform intensity having a predetermined focus spot, and power operated means including a turntable for rotating the workpiece about a rotational axis with the workpiece seam being contained in a plane perpendicular to the rotational axis of the turntable, the optical position detector being movable relative to the workpiece for scanning the workpiece surface with the laser focus spot, the photodetector being positioned to receive radiation reflected from the workpiece, the photodetector producing a continuous output signal variable in relation to the intensity of said reflected radiation for indicating the position of the workpiece seam when said signal is below a predetermined threshold.

2. The apparatus of claim 1 wherein the optical position detector includes an output focus member adjacent the workpiece for directing radiation reflected from the workpiece along a selected output axis, the photodetector being located on the output axis at a focus spot of the output focus member.

3. The apparatus of claim 2 wherein the laser producing means of the optical position detector produces a beam directed along a beam input axis, and wherein the optical position detector includes an input focus member positioned on the beam input axis for focusing the beam at the focus spot on the workpiece.

4. The apparatus of claim 1 wherein the power operated means further includes drive means operable independently of said turntable for selectively shifting the laser focus spot of the optical position detector relative to said plane containing a workpiece seam.

5. The apparatus of claim 1 further including means for performing a work operation on the workpiece in remote relation to the optical position detector, and timing circuit means for controlling the work performing means responsive to the output signal of the optical position detector.

6. An apparatus for locating a seam between abutting reflective surfaces of a workpiece and comprising a housing, power operated means for moving the workpiece and the housing relative to one another with the workpiece seam being contained in a plane, level sensing means mounted in the housing for determining the plane containing the workpiece seam, and seam end sensing means mounted in the housing for sensing the beginning and end of a seam, the level sensing means and the seam end sensing means each including a plurality of precision optical position detectors, said detectors each including a photodetector and means for producing a continuous laser beam of substantially uniform intensity having a predetermined focus spot for scanning the workpiece, the photodetector being positioned to receive radiation reflected from the workpiece, the photodetector producing a continuous output signal variable in relation to the intensity of said reflected radiation for establishing location of the seam.

7. The apparatus of claim 6 wherein the power operated means includes a turntable for rotating the workpiece about a rotational axis with the workpiece seam being contained in a plane perpendicular to the rotational axis of the turntable, wherein the power operated means further includes an independently and selectively operable carriage slidably supported on the frame for reciprocating movement perpendicular to the plane containing the workpiece seam, and wherein the housing is mounted on the carriage for selectively positioning the detectors of the level sensing means and the seam end sensing means relative to the workpiece.

8. The apparatus of claim 7 wherein the optical position detectors of the level sensing means are movable by the carriage into an operating position wherein the laser focus spots of the level sensing detectors are aligned for striking the workpiece in said plane of the workpiece seam, and wherein the seam end sensing means includes a pair of said optical position detectors selectively movable by the carriage into an operative position wherein the laser focus spots of the seam end sensing detectors are respectively focused on the workpiece on opposite sides of said plane containing the workpiece seam when the level sensing detectors are in said operating position.

9. The apparatus of claim 8 wherein a plurality of seams are contained in said plane and spaced apart by non-reflective gaps between equally spaced reflective surfaces defining the seams, the level sensing detectors being spaced apart relative to the reflective surfaces of the workpiece such that at least one of the focus spots of the level sensing detectors strikes one workpiece seam during rotation of the turntable and the workpiece relative to the level sensing means in said operating position.

10. An apparatus for locating a seam between abutting reflective surfaces of a workpiece, the apparatus comprising an optical position detector including a photodetector and means for producing a continuous laser beam of substantially uniform intensity having a predetermined focus spot, a frame, and power operated means including a turntable and an independently and selectively operable reciprocating carriage for moving the workpiece and the position detector relative to one another for scanning the workpiece surface with the laser focus spot, the turntable being supported on the frame for rotating the workpiece about a rotational axis with the workpiece seam being contained in a plane perpendicular to the rotational axis of the turntable, the carriage being slidably supported on the frame for reciprocating movement perpendicular to the plane containing the workpiece seam, the optical position detector being mounted on the carriage for selectively positioning the level of the laser focus spot relative to the workpiece, the photodetector being positioned to receive radiation reflected from the workpiece, the photodetector producing a continuous output signal variable in relation to the intensity of said reflected radiation for indicating the position of the workpiece seam when said signal is below a predetermined threshold.

11. The apparatus of claim 10 wherein a plurality of said optical position detectors are mounted on the carriage for selective movement therewith in unison relative to the workpiece, the detectors providing a corresponding plurality of focus spots contained in a plane extending perpendicular to the rotational axis of the turntable for determining the level of said plane containing the workpiece seam.

12. The apparatus of claim 11 wherein said optical position detectors are movable by the carriage into an operating position wherein the laser focus spots of the detectors are aligned for striking the workpiece in said plane of the workpiece seam, wherein a plurality of seams are contained in said plane and spaced apart by non-reflective gaps between equally spaced reflective surfaces defining the seams, the aligned laser focus spots being spaced apart relative to the reflective surfaces of the workpiece such that at least one of the focus spots strikes one workpiece seam during rotation of the turntable and workpiece relative to the optical position detectors in said operating position.

13. The apparatus of claim 10 further including a second optical position detector, the first and second optical position detectors being selectively movable by the carriage into an operative position wherein their laser focus spots are respectively focused on the workpiece on opposite sides of said plane containing the workpiece seam with opposite ends of the seam bounded by non-reflective matter, the laser focus spots being disposed in adjacent perpendicular relation to said plane for determining the beginning and end of the seam upon rotating the turntable and the workpiece relative to the optical position detectors in operative position.

* * * * *